March 2, 1971 P. ISAAC 3,567,578
NUCLEAR REACTOR INSTALLATION
Filed April 15, 1968 8 Sheets-Sheet 1

March 2, 1971  P. ISAAC  3,567,578
NUCLEAR REACTOR INSTALLATION
Filed April 15, 1968  8 Sheets-Sheet 3

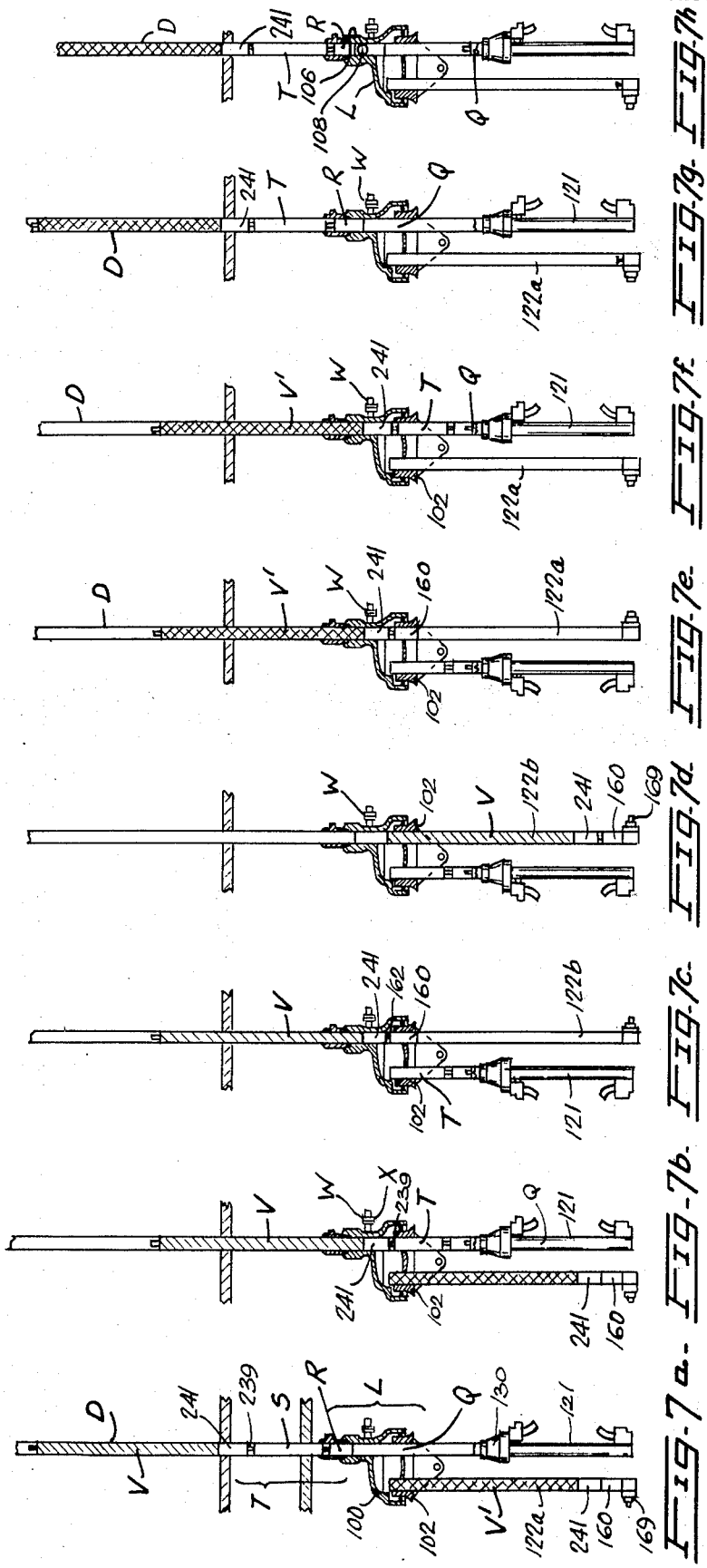

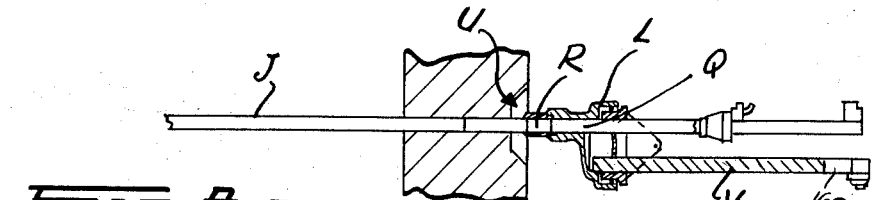
Fig. 8.a.
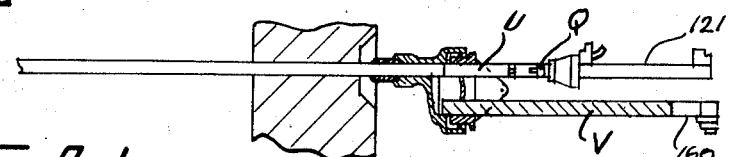
Fig. 8.b.
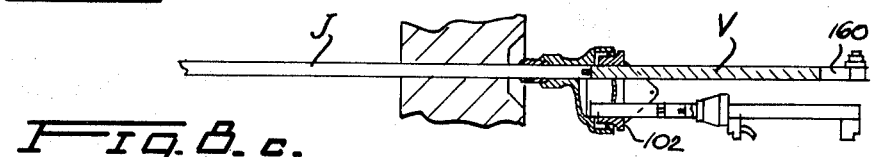
Fig. 8.c.
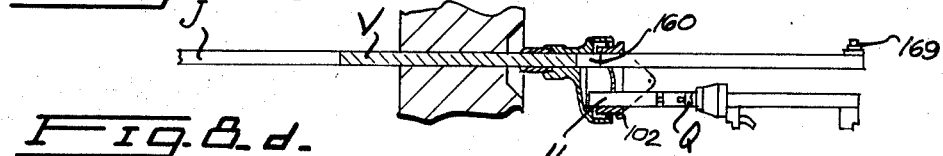
Fig. 8.d.
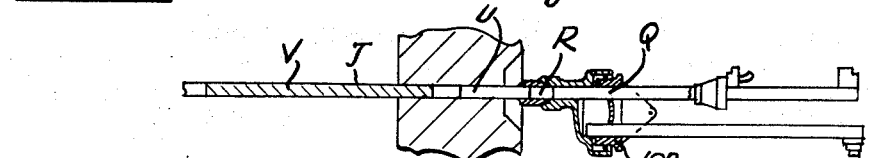
Fig. 8.e.
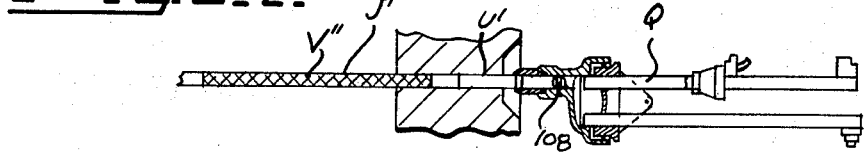
Fig. 8.f.
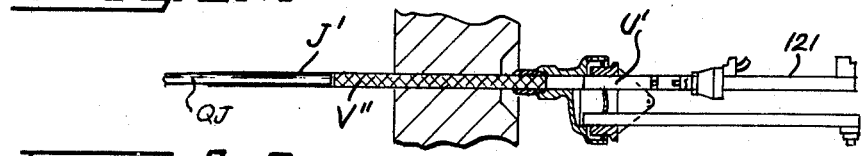
Fig. 8.g.
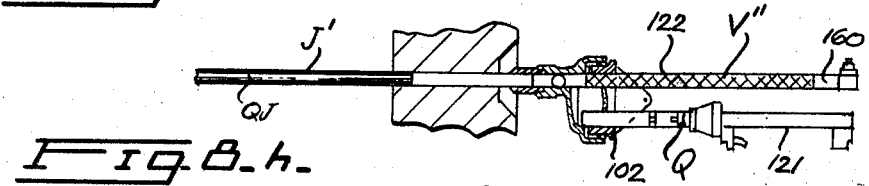
Fig. 8.h.
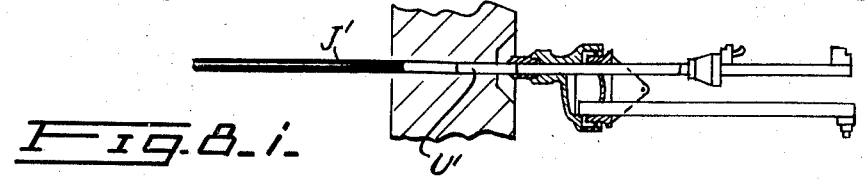
Fig. 8.i.

United States Patent Office 3,567,578
Patented Mar. 2, 1971

3,567,578
NUCLEAR REACTOR INSTALLATION
Peter Isaac, Cooksville, Ontario, Canada, assignor to Atomic Energy of Canada Limited, Ottawa, Ontario, Canada
Filed Apr. 15, 1968, Ser. No. 721,295
Int. Cl. G21c 19/24
U.S. Cl. 176—30                                    11 Claims

ABSTRACT OF THE DISCLOSURE

A fuelling machine head comprises an end wall with a snout for connecting reactor fuel channels and replenishment fuel transfer channels, a skirt portion, and a turret rotatably mounted in the skirt portion for supporting a number of tubes and aligning them with the snout. The tubes serve snugly to receive used and fresh fuel strings and a plug closing the channels. A fluid pressure-tight seal is disposed between the turret and the end wall so that the space defined within the turret is small in comparison with the volume of the tubes.

Reference is made to related copending U.S. applications Ser. Nos. 721,293; 721,294; 721,358; 721,408; 721,409; and 721,410 filed Apr. 15, 1968.

The present invention relates to a nuclear reactor installation including a reactor, preferably of the type using heavy water as moderator and water (heavy or light) as coolant, and a fuelling machine for loading and unloading fuel aggregates into and from fuel channels of the reactor.

In the United States Hummel Pat. No. 3,169,910 issued Feb. 16, 1965, a nuclear reactor fuelling machine is described which includes a magazine housing and several magazine tubes connected to a supporting framework rotatably mounted within the housing so as to align each of the tubes at one end with a snout which connects the machine to a selected one of the fuel channels, and at the other end with a ram mechanism which moves the fuel strings between the respective tube and the selected channel. The snout comprises a shut-off valve which is opened when the machine is connected to the selected channel after raising the pressure in the machine to the high level of pressure existing in the interior of the reactor channel. The fuelling machine is filled with water of the same type as is used as coolant in the reactor; in the present case light water. The used fuel strings are then replaced by fresh fuel strings from a storage, which is normally held at a much lower pressure level. The pressure within the machine head has to be reduced before connecting the magazine to such storage. The reduction of pressure requires that the water be cooled to prevent boiling during every complete load and replenishment cycle. The time required for cooling the water can be rendered reasonably short only by using a correspondingly large circulating pump. Furthermore, since while loading the fuel channels the magazine contains a considerable amount of water under high pressure, the entire structure of the fuelling machine has to be designed to accommodate a substantial mass.

In the present invention, no magazine housing is provided in the fuelling machine. Instead the machine comprises:

a machine head including a snout at one end thereof and means for aligning this snout with a selected one of the fuel channels, at least two tubes for snugly housing at least portions of said fuel aggregates, each of said tubes including means movable relatively to the respective tube for displacing a said portion into and from said selected channel, means supporting the tubes movably on said machine head, including means for indexing the supporting means to align either of the tubes with the snout, and fluid-pressure-tight sealing means bearing against a wall of the machine head adjacent the snout end thereof for sealing the interiors of the tubes against their exteriors.

The amount of water required for the machine head of the present invention is thereby minimized to correspond substantially to the volume of the tubes alone, thus resulting in considerably shorter periods required for adapting the water pressure and particularly the water temperature in the machine head to the varying operating conditions.

Further features of the present invention will appear from the following specific description which is provided by way of example only.

Figure 5:
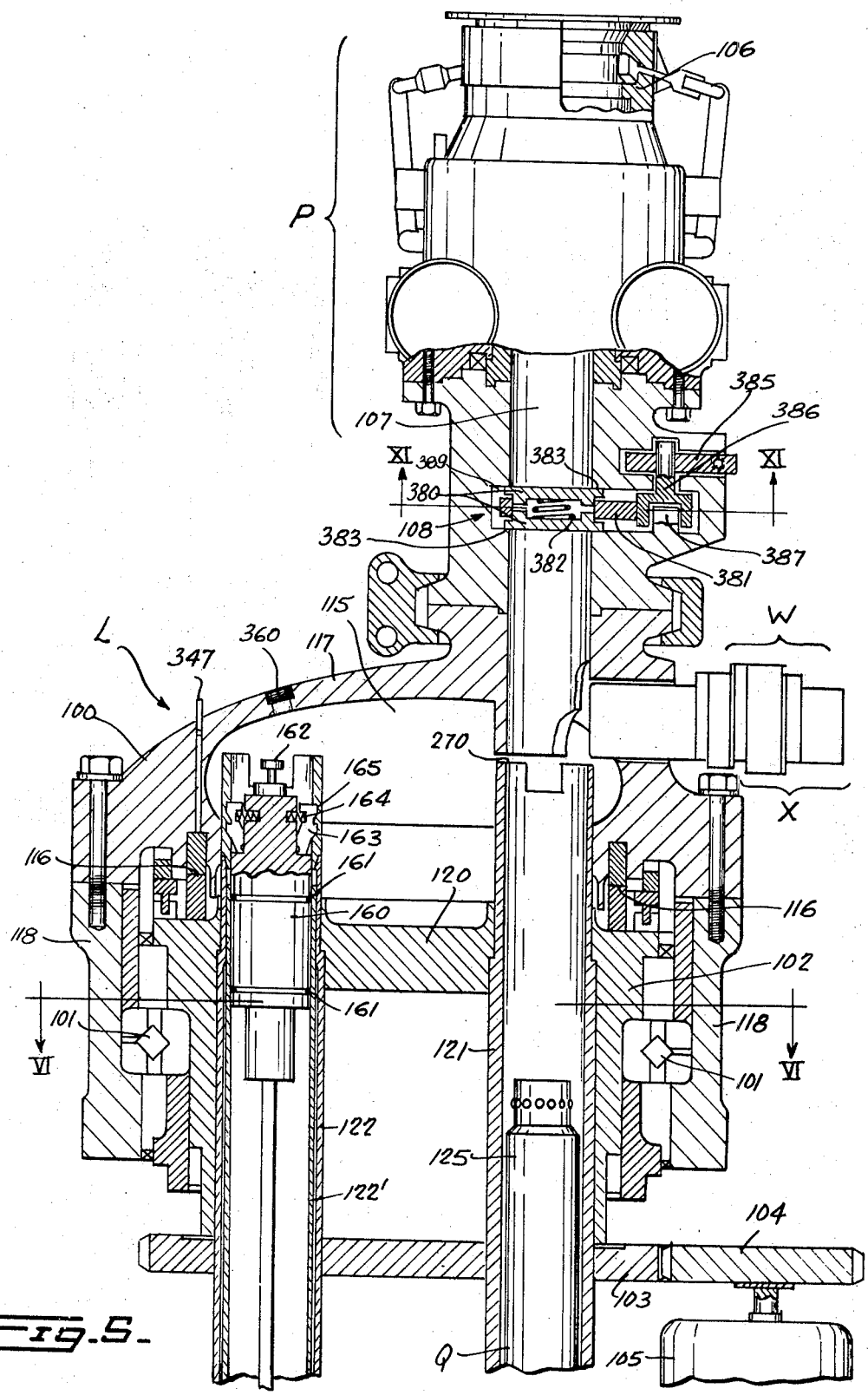
FIG. 5 shows the upper portion of the fuelling machine head, this view being a section taken on the line V—V in FIG. 6.
Figure 9:
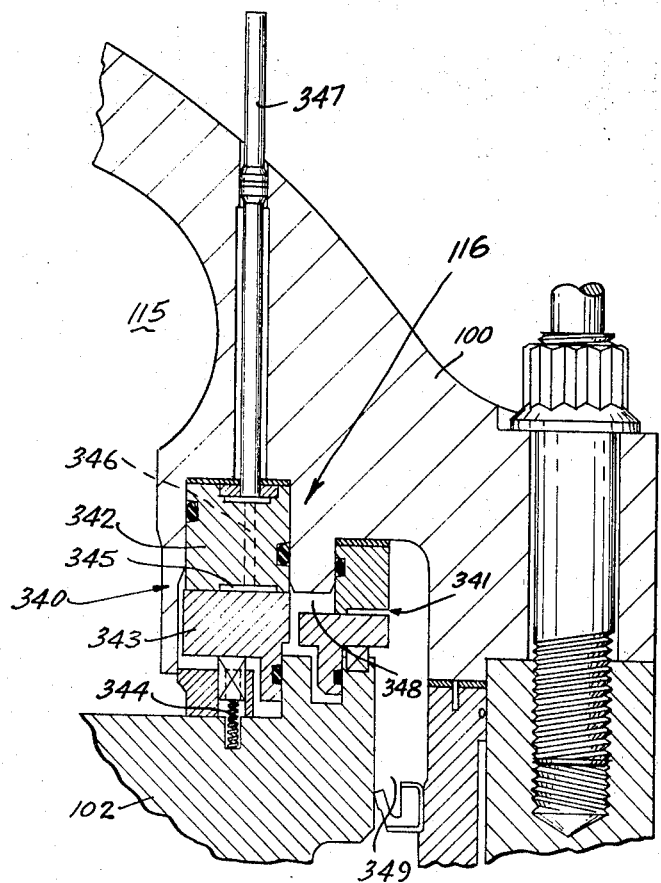
Figure 10:
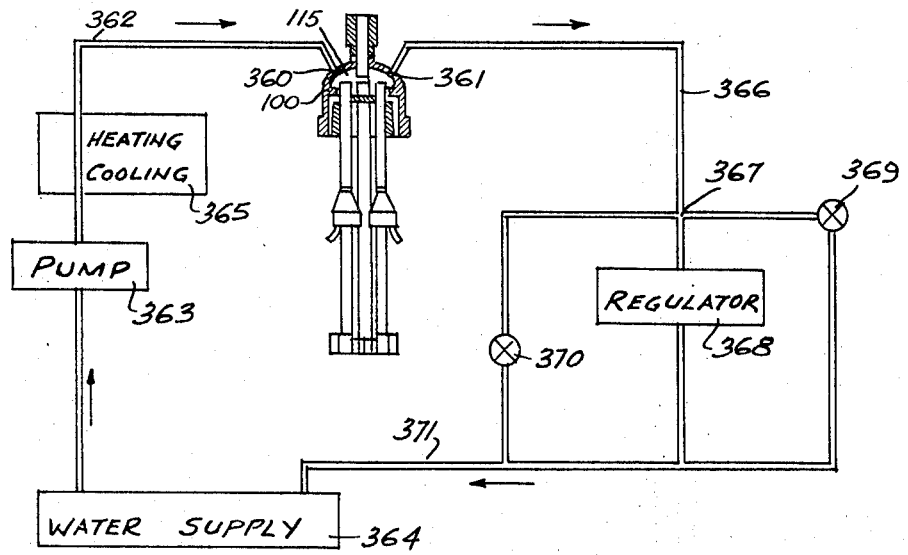
Figure 11:
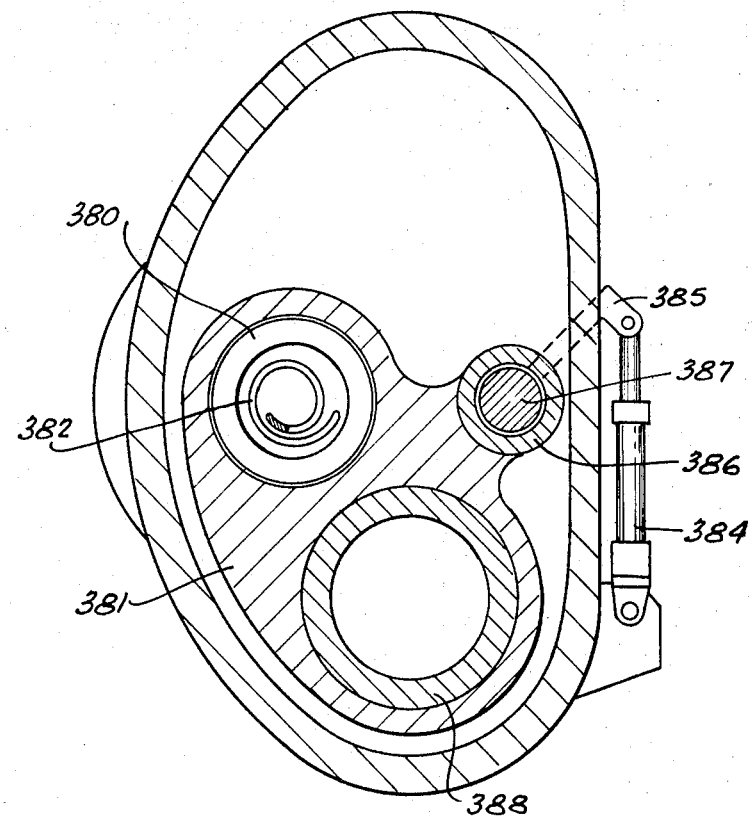

FIG. 7 consists of a series of small scale diagrammatic views a to h demonstrating a sequence of steps in a fuel unloading and reloading operation;

FIG. 8 consists of a further, similar series of small scale diagrammatic views a to i demonstrating a sequence of steps in a fuel replenishment operation;

FIG. 9 is a portion of the machine head of FIG. 5, shown on an enlarged scale;

FIG. 10 shows a schematic view of a water supply and control system used in connection with the fuelling machine head; and FIG. 11 is a cross-section taken on line XI—XI of FIG. 5.

OVERALL ARRANGEMENT OF FUELLING MACHINE

Figure 1:
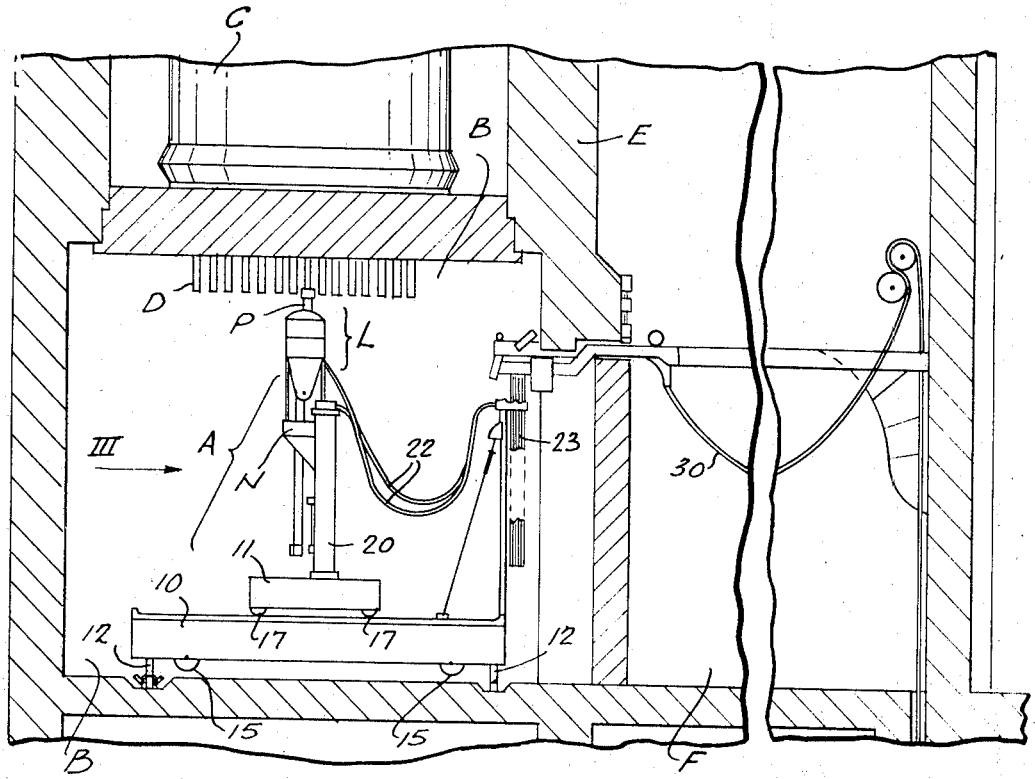
FIG. 1 is a cut-away elevation view of a fuelling machine associated with a nuclear reactor.
Figure 2:
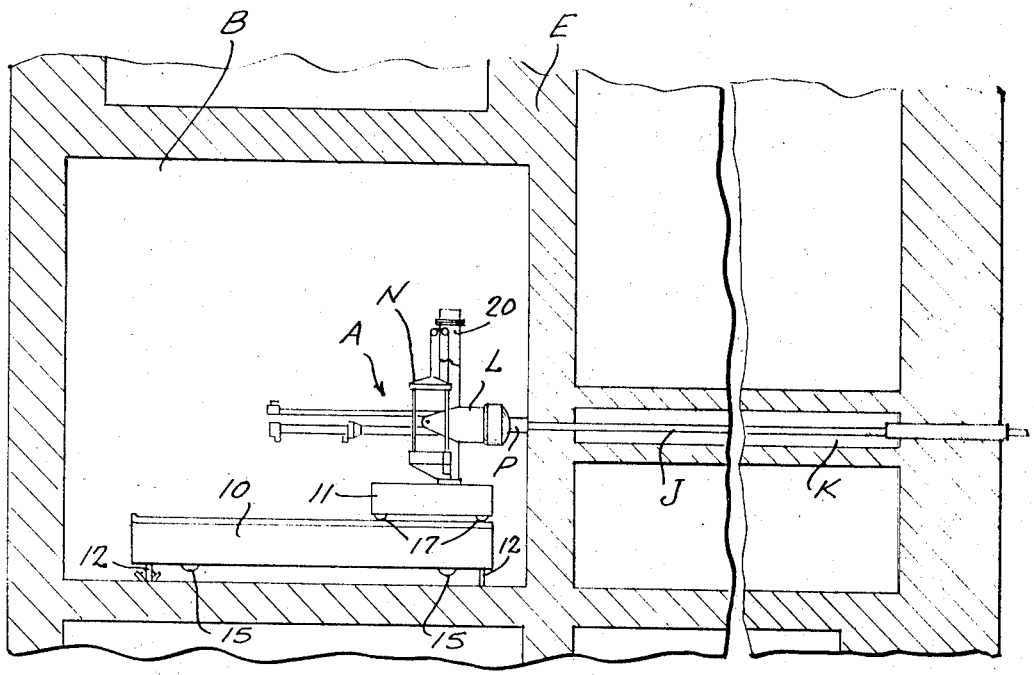
FIG. 2 is a cut-away elevation view showing the fuelling machine in a different position.

FIGS. 1 and 2 illustrate the overall arrangement of a fuelling machine A located in a vault B beneath a nuclear reactor vesel C that has a plurality of fuel channels D that are required to be kept supplied with strings of nuclear fuel. The building E in which the reactor C is housed is also constructed with a maintenance bay F adjacent the fuelling vault B, in which bay F the fuelling machine A is serviced. Leading from a fuel shuffling bay outside the reactor building E to the fuelling vault B are three fuel transfer tubes J that extend through a fuel transfer bay K.

The fuelling machine A comprises a main carriage 10 along which a trolley 11 can travel. The carriage 10 is provided with four wheels 12 for travel along the fuelling vault B in a first direction. The carriage 10 also has a set of four wheels 15 for travel in a direction perpendicular to the first direction. To carry out the required movements, all the wheels 12 and 15 are connected to be driven by hydraulic motors (not shown) in a conventional manner. Movement of the trolley 11 along the main carriage 10 is effected by means of a set of wheels 17 also driven by one or more motors (not shown). The power supply to the several motors is effected by cables connecting a head L of the fuelling machine A to a source placed outside the maintenance bay F. The cables are arranged to form spans 22, 23 and 30 having sufficient slack to enable free travel of the trolley 11 on the carriage 10 and of the carriage itself in both directions.

Figure 3:
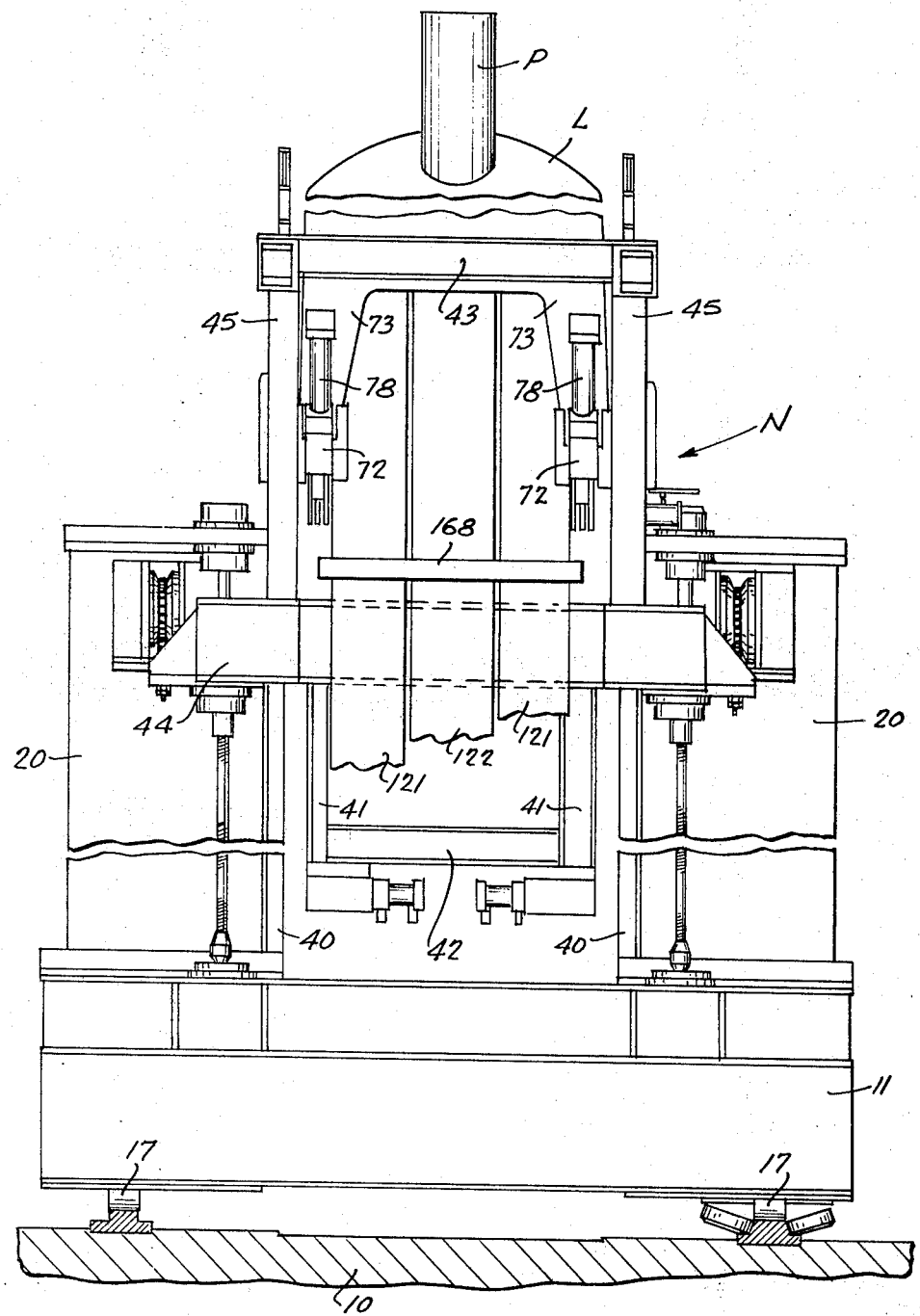
FIG. 3 is a view of this machine seen in the direction of the arrow III in FIG. 1.
Figure 4:
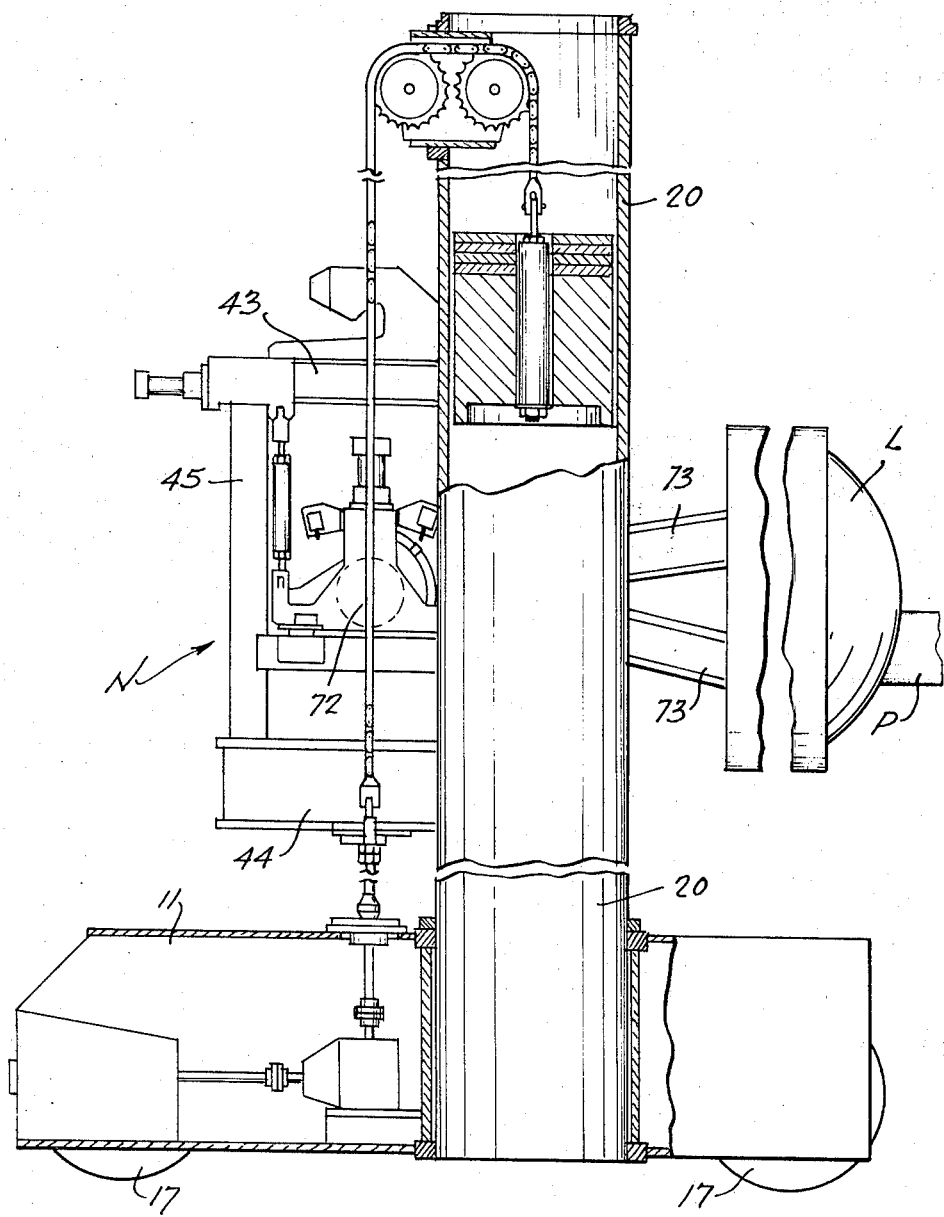
FIG. 4 is an enlarged view of the machine shown in the position of FIG. 2.

As shown in FIGS. 3 and 4, two upright columns 20 are mounted on the trolley 11. Secured to the vertical surfaces of the columns 20 that face one another are slide ways 40 in which there are slidingly engaged a pair of vertically elongated members 41 interconnected by a member 42. The sliding members 41 form part of a vertically movable carriage N that also includes upper and lower frame members 43 and 44 joined at their corners by four vertical members 45. The fuelling machine head L is supported on the carriage N by means of two arms 73 rotatably mounted on two pins 72. Two hydraulic cylinders 78 serve to rotate the arms 73 and thus the machine head L from the vertical orientation shown in FIGS. 1 and 3 to its horizontal orientation shown in FIGS. 2 and 4, and vice versa.

GENERAL STRUCTURE OF THE FUELLING MACHINE HEAD

Figure 6:
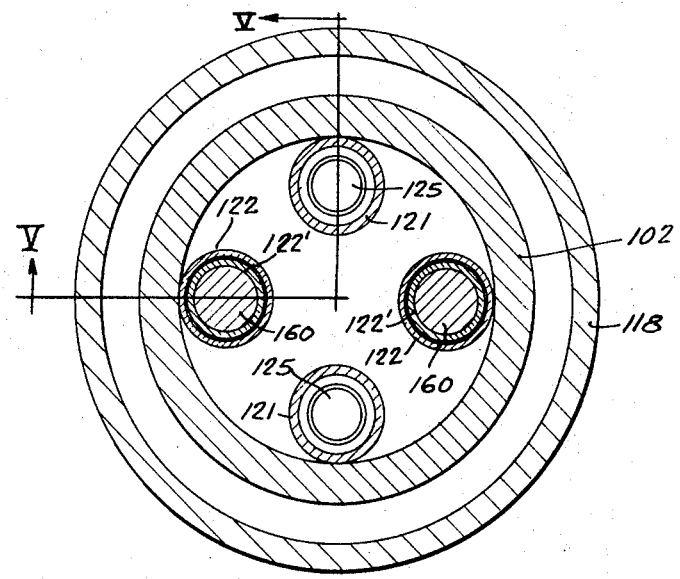
FIG. 6 is a transverse section on the line VI—VI in FIG. 5.

Details of the structure of the fuelling machine head L are shown in FIGS. 5 and 6. The head consists of a main housing 100 that is rigidly connected on each side to one of the arms 73 and contains an end wall 117, a skirt portion 118, and a bearing assembly 101 by means of which a turret 102 is rotatably mounted in the machine head. The turret 102 carries a large toothed wheel 103 meshing with a toothed wheel 104 on the shaft of a motor 105, this motor being employed for indexing the turret 102 between various positions relative to the main housing 100, in the manner and for the purposes described below.

Rigidly connected to the end wall 117 is a snout sub-assembly P including at its end a locking mechanism 106 for engaging the end of a reactor fuel channel D in the manner shown on the small scale in FIG. 1 or of a fuel transfer tube J as shown in FIG. 2. The snout sub-assembly P also serves to define a channel 107 extending from the locking mechanism 106 to the turret 102, in which channel a shut-off valve 108 is located.

According to FIGS. 5 and 11, the shut-off valve 108 comprises two flaps 380 guided in an arm 381 and a pressure spring 382 disposed between the flaps 380 to urge them apart and against seats 383 to seal both portions of the channel 107. When opening the valve 108 by retracting the piston of a hydraulic cylinder assembly 384 attached to a lever 385, a member 386 connected to the lever 385 is rotated about an axle 387 disposed parallel to the axis of the channel 107, thereby swinging the flaps 380 out of the channel and aligning with it a tubular piece 388 which is also held by the arm 381, has the same inner diameter as the channel 107 and serves to bridge a gap 389 that would otherwise appear in the wall of the channel 107. The valve 108 is shown in FIGS. 5 and 11 in its closed position.

During operation, a space 115 defined within the machine head L will be in communication via the channel 107 with the interior of a reactor fuel channel D under high pressure. It is therefore necessary to provide the interior of the machine head L with means for sealing such pressure against the exterior, this being accomplished by means of a controlled leakage hydrostatic seal 116, details of which are shown in FIG. 9 and described below.

According to the more detailed view of FIG. 9, the hydrostatic seal 116 comprises a main seal 340 adjacent the interior space 115 of the fuelling machine head L and a back-up seal 341 adjacent the exterior. The main seal 340 includes a fixed sealing body 342 tightly disposed in the main housing 100 and a rotating sealing body 343 tightly disposed in the rotatable turret 102 and urged against the fixed sealing body 342 by a pressure spring 344. A small cavity 345 at the interface between the fixed and the rotating sealing bodies 342, 343 is connected via bore 346 through the fixed sealing body 343 to a water input conduit 347. During the indexing of the turret 102 sufficient water pressure is applied through the conduit 347 to open the main seal 340. Thus, during the indexing motion only the back-up seal 341 is effective. By maintaining the pressure in the space 348 between the main seal 340 and the back-up seal 341 above the pressure inside the interior space 115 of the fuelling machine head L, any water in the space 115 is prevented from being lost. Any leakage that may occur through the back-up seal 341 is fed back to a water supply through a drainage channel 349.

The turret 102 comprises a head portion 120 from which four barrels 121 and 122 extend downwardly, such barrels constituting a pair of oppositely disposed ram barrels 121 and a pair of oppositely disposed fuel barrels 122 arranged intermediate the ram barrels.

Each ram barrel 121 serves to house a ram mechanism Q comprising a ram head 125 which can be displaced in the barrel 121 by a drive unit 130 (FIG. 3) to pass through the channel 107 and extract or insert a closure plug from or into a fuel channel D or a fuel transfer tube J engaged by the snout sub-assembly P.

Each of the fuel barrels 122 is provided with a liner 122' in which there is slidably mounted a free piston 160 having seals 161 encircling its perimeter. At its forward end the piston 160 has a projecting T-shaped pin 162, and at an intermediate location it carries pivoted mechanical stops 163 that are urged radially outwardly by springs 164 into engagement with cavities 165 in the barrel 122. The stops 163 and cavities 165 are shaped to prevent the piston 160 moving upward from the position shown, while leaving it free to move downward. A value 169 (FIG. 7a) is provided for controlling liquid pressure in the barrel 122. Externally the four barrels 121, 122 are braced by interconnecting structural members 168 (FIG. 3).

The channel 107 through the snout sub-assembly P and the barrels 121, 122 are substantially of the same diameter as the reactor fuel channels D. As shown in FIGS. 3 and 5, the space 115 defined between the turret head portion 120, the barrels 121, 122, the end wall 117 and the shut-off valve 108 is small in comparison with the volume of the barrels 121, 122.

As shown in the essentially schematic view of FIG. 10, the main housing 100 of the fuelling machine head L is provided at two opposite locations with two bores 360, 361, only one of which (360) is visible in FIG. 5. The bore 360 connects the interior space 115 of the machine head L via a pipe 362 with a pump 363 which draws water from a water supply 364. The pipe 362 passes through a heating and cooling system 365. Another pipe 366 connects the second bore 361 via a manifold 367 to an electrically controlled regulator 368, a relief valve 369 and a maintenance valve 370. The regulator 368, the relief valve 369 and the maintenance valve 370 are connected to a common pipe 371 leading back to the water supply 364.

During reactor operation, the pump 363 continuously feeds water in the direction of the arrows through the heating and cooling system 365, the pipe 362, the interior space 115 of the machine head L and the pipe 366 to the regulator 368 which can be set selectively to control the pressure that is to be built-up within the fuelling machine with respect to the operating condition of the machine. In a typical embodiment of a fuelling machine according to this invention, a pressure of about 975 p.s.i. is required when the machine head L is connected to one of the reactor fuel channels D, while a pressure of about 600 p.s.i. is required when the machine is connected to one of the fuel transfer channels J. Similarly, the water temperature has to be adapted to a certain extent to the temperature within the reactor fuel channels, which may in a typical embodiment be about 500° F., as well as to the much lower temperature existing in the transfer tubes J. A suitably large pump 363 providing a high rate of water flow through the machine and the small capacity of the machine head L resulting from the novel basic concept of this invention allow fast adaptation of the water pressure and especially of the water temperature within the machine head L according to its various operating conditions.

The maintenance valve 370 is used when the fuelling machine is to be depressurized for maintenance purpose. The relief valve 369 will open upon over-pressure that may be caused by a malfunction of the regulator 368.

FUEL UNLOADING AND RELOADING PROCEDURE

FIG. 7 shows in a series of small scale views designated a to h, the principal steps in a fuel unloading and reloading operation. FIG. 7a shows a reactor fuel channel D containing a closure plug R and shield plug S, together designated as a plug assembly T. The plug assembly T is connected to a tensioning mechanism 241 on the end of a fuel string V by means of a T-pin 239. It is assumed that the fuel string V consists of at least partly spent fuel and is to be removed from channel D and replaced by a fresh fuel string V' which is stored in a first one of the two fuel barrels 122 (here designated 122a) of the fuelling machine head L. One of the ram barrels 121 is aligned with the channel D and the ram mechanism Q has been advanced to release the closure plug R.

The ram mechanism Q is now fully withdrawn (FIG. 7b), which action has the effect of drawing the plug assembly T down into the barrel 121 in such a manner as to align its T-pin 239 with the extreme end 270 (FIG. 5) of the barrel 121. A mechanism X (FIG. 5) in the machine head L, which is described in detail in the copending United States patent application 721,293 filed Apr. 15, 1968 now ensures alignment of the open sides of a corresponding T-slot of the tensioning mechanism 241 at the end of the fuel string V with the circumferential direction of movement of the turret 102. A further mechanism W (FIG. 5) which is described in detail in the copending U.S. application Ser. No. 721,410 filed Apr. 15, 1968 provides means for locking the fuel string temporarily in this position at this time. The circumferential alignment together with the fact that the fuel string cannot at this time move longitudinally permits the turret 102 to be indexed through 90°, which action is now carried out (FIG. 7c) with the effect that the T-pin 239 on the upper end of the plug assembly T is moved sideways out of its former engagement with the T-slot and is replaced by the T-pin 162 on the end of piston 160 in the other of the fuel barrels 122b, which second fuel barrel is empty at this time.

The next step (FIG. 7d) is to draw the fuel string V down into the fuel barrel 122b, and this effect is achieved by a gradual reduction of liquid pressure in the barrel 122b behind the piston 160 under the control of the valve 169.

The turret 102 is now indexed around by 180° to bring the fuel barrel 122a containing the fresh fuel string V' into register with the channel D, whereupon sufficient pressure is applied behind the piston 160 in the barrel 122a to force it to move upwardly against the liquid pressure in the channel itself, thus moving the fuel string V' into the channel D (FIG. 7e). With the new string locked in this position, the turret 102 is now again indexed through 90° to return the ram barrel 121 to alignment with the channel D (FIG. 7f), and thus connect the plug assembly T stored in the barrel 121 to the tensioning mechanism 241 of the new fuel string V'. The ram mechanism Q is then advanced to reinsert the plug assembly T with the fuel string V' attached thereto into the channel D (FIG. 7g).

Finally, the closure plug R is replaced in the end of the channel D and the ram mechanism is retracted (FIG. 7h).

The liquid pressure inside the machine head L is then reduced, the shut-off valve 108 closed and the locking mechanism 106 of the machine head L released in order to disengage the fuelling machine head from the particular channel D that has been refuelled.

It will have been noticed that during the refuelling operation only one of the ram barrels 121 was used and indeed only one is strictly necessary. In practice, the second ram barrel houses a ram mechanism and a spare closure plug assembly which is inserted into the fuel channel in the event that the original plug is leaking or defective or that the complex ram mechanism does not function properly.

FUEL REPLENISHMENT PROCEDURE

Once the machine head has been disengaged from the end of the channel D just refuelled, the various motors are operated in the necessary sequence to lower the carriage N, drive the carriage 10 to a location opposite one of the fuel transfer tubes J, tilt the machine head L and then move the trolley 11 into position for the snout subassembly of the head L to engage an end of the selected transfer tube J in the manner shown in FIG. 2.

These ends of the tubes J are formed in a manner similar to the lower ends of the channel D, each tube end containing a plug assembly U similar to the plug assembly T already described, except that there is no coupling between the plug U and the fuel string in the transfer tube J. Accordingly the procedure for reloading the machine head with a fresh fuel string and unloading the used fuel string into a tube J is analogous to the operation just described in relation to the unloading and reloading of a channel D. This procedure for replenishing the fuelling machine is illustrated in the various parts of FIG. 8, which show diagrammatically only the essential parts of the machine as viewed in FIG. 2.

FIG. 8a shows a first step in which the snout subassembly of the machine head L has been locked on to the end of an empty transfer tube J and, after the pressures have been equalised, the ram mechanism Q has advanced to release the closure plug R of a plug assembly U. At the next stage (FIG. 8b) the ram mechanism Q is withdrawn to draw the plug assembly U back into the ram barrel 121. Then the turret 102 is indexed (FIG. 8c) to align the used fuel string V with the tube J and the piston 160 is driven by excess pressure behind it to force the fuel string V into the tube J (FIG. 8d), after which the turret 102 is indexed back again to reinstate the plug assembly U into the tube J and to push the plug assembly U and the fuel string V further into the tube J (FIG. 8e) and secure the closure plug R in place.

After retracting the ram mechanism Q, lowering the pressure in the machine head and closing the valve 108, the snout is disengaged from the end of the tube J and the machine is moved to alignment with a second one of the tubes, here designated J' (FIG. 8f). The tube J' will contain a fresh fuel string V'' and a plug assembly U'. The latter is drawn into the ram barrel 121 (FIG. 8g) and then the fuel string V'' is pushed by a fuel unloading ram QJ in the transfer tube J' into the fuel barrel 122 (FIG. 8h) until the string V'' is in a position where the T-pin 162 of the piston 160 can engage the T-slot at the front end of the string V'' by indexing the turret 102. Finally, the ram mechanism Q is indexed back into alignment with the tube J' and the plug assembly U' is returned to the tube J' to close it (FIG. 8i). The fuelling machine is then free to return to another one of the channels D to unload it and reload it with the fuel string V'' in the manner already described.

Instead of the above described procedure, the replenishment cycle may be carried out in the following way. The fuelling machine head L is connected to a transfer tube J filled with a fresh fuel string V'' rather than to an empty transfer tube. After opening the shut-off valve 108 and releasing and withdrawing the plug assembly U, the fresh fuel string V" is pushed by the unloading ram QJ into the empty one of the fuel barrels 122 in the fuelling machine in the way described in connection with FIGS. 8g and 8f. The turret 102 is then indexed to align the other fuel barrel 122 that contains the used fuel string V with the same fuel transfer tube J. By means of the free piston 160 the used fuel string V is pushed into the same transfer tube J, the turret is indexed further to align the ram barrel 121 with the transfer tube, the plug assembly U is re-inserted and locked in the transfer tube and the fuelling machine head L is disconnected. This second sequence of replenishment steps is faster because no intermediate reinsertion and removal of a plug assembly U and no intermediate movement of the fuelling machine is required.

I claim:

1. A nuclear reactor installation including a reactor and a fuelling machine for loading and unloading fuel aggregates into and from fuel channels of said reactor, said fuelling machine comprising:
    (a) a machine head including a snout at one end thereof and means for aligning said snout with a selected one of said fuel channels,
    (b) at least two tubes for snugly housing at least portions of said fuel aggregates, each of said tubes including means movable relatively to the respective tube for displacing a said portion into and from said selected channel,
    (c) means supporting said tubes movably on said machine head, including means for indexing said supporting means to align either of said tubes with said snout, and
    (d) fluid-pressure-tight sealing means bearing against a wall of said machine head adjacent said snout end thereof for sealing the interiors of said tubes against the exteriors thereof.

2. A nuclear reactor installation including a reactor and a fuelling machine for unloading used fuel strings from and loading fresh fuel strings into fuel channels of said reactor, said fuelling machine comprising:
    (a) a machine head including a snout at one end thereof and means for aligning said snout with a selected one of said fuel channels,
    (b) a first tube for snugly housing a said used fuel string, including means for displacing said used fuel string from said selected channel into said first tube,
    (c) a second tube for snugly housing a said fresh fuel string, including means for displacing said fresh fuel string from said second tube into said selected channel,
    (d) means supporting said tubes movably on said machine head, including means for indexing said supporting means to align either of said tubes with said snout, and
    (e) fluid-pressure-tight sealing means bearing against a wall of said machine head adjacent the snout end thereof for sealing the interiors of said tubes against the exteriors thereof.

3. An installation as in claim 1, wherein said indexing means comprise means for rotating said supporting means about an axis parallel to said tubes.

4. An installation as in claim 1, wherein said sealing means comprise hydrostatic sealing means.

5. An installation as in claim 1, wherein said snout comprises a shut-off valve.

6. An installation as in claim 1 including a closure plug disposed in the end portion of each said fuel channel.

7. An installation as in claim 6, wherein said fuelling machine comprises a third tube for snugly housing said closure plug, and means for displacing said closure plug between said selected channel and said third tube.

8. An installation as in claim 7, wherein said fuelling machine comprises a fourth tube for snugly housing said closure plug, and means for displacing said closure plug between said selected channel and said fourth tube.

9. An installation as in claim 8, wherein said third and fourth tubes are supported on said supporting means and fluid-pressure-tightly sealed against said wall.

10. An installation as in claim 1, wherein said tubes are fluid-pressure-tightly connected to said supporting means and wherein said sealing means are disposed between said supporting means and said wall.

11. A nuclear reactor installation including a reactor and a fuelling machine for unloading used fuel strings from and loading fresh fuel strings into fuel channels of said reactor, said fuelling machine comprising:
    (a) a machine head having an end wall and a skirt portion extending from said end wall in a first direction, including a snout extending from said end wall in a second direction opposite to said first direction and means for moving said machine head to align said snout with a selected one of said fuel channels,
    (b) a first tube for snugly housing a said used fuel string, including a piston slidable in said first tube for displacing said used fuel string from said selected channel into said first tube,
    (c) a second tube for snugly housing a said fresh fuel string, including a piston slidable in said second tube for displacing said fresh fuel string from said second tube into said selected channel,
    (d) a turret mounted within said skirt portion to rotate about an axis extending in said second direction, said turret supporting said tubes to extend in said second direction outwardly of said skirt portion, and means for rotating said turret about said axis to align either of said tubes with said snout,
    (e) said turret and said machine head defining a space small in comparison with the volume of said tubes, and
    (f) fluid-pressure-tight sealing means extending between said head and said turret to seal the interiors of said tubes and of said space against the exteriors thereof.

References Cited

UNITED STATES PATENTS 3,169,910  2/1965  Hummel _____ 176—31

FOREIGN PATENTS 895,356  5/1962  Great Britain _____ 176—30

CARL D. QUARFORTH, Primary Examiner

H. E. BEHREND, Assistant Examiner

U.S. Cl. X.R.

214—18